Oct. 17, 1950     H. J. HEPP ET AL     2,526,564
METHOD OF RECOVERING ANHYDROUS ALUMINUM CHLORIDE
FROM FLUID ALUMINUM-HYDROCARBON COMPLEX
Filed July 29, 1946
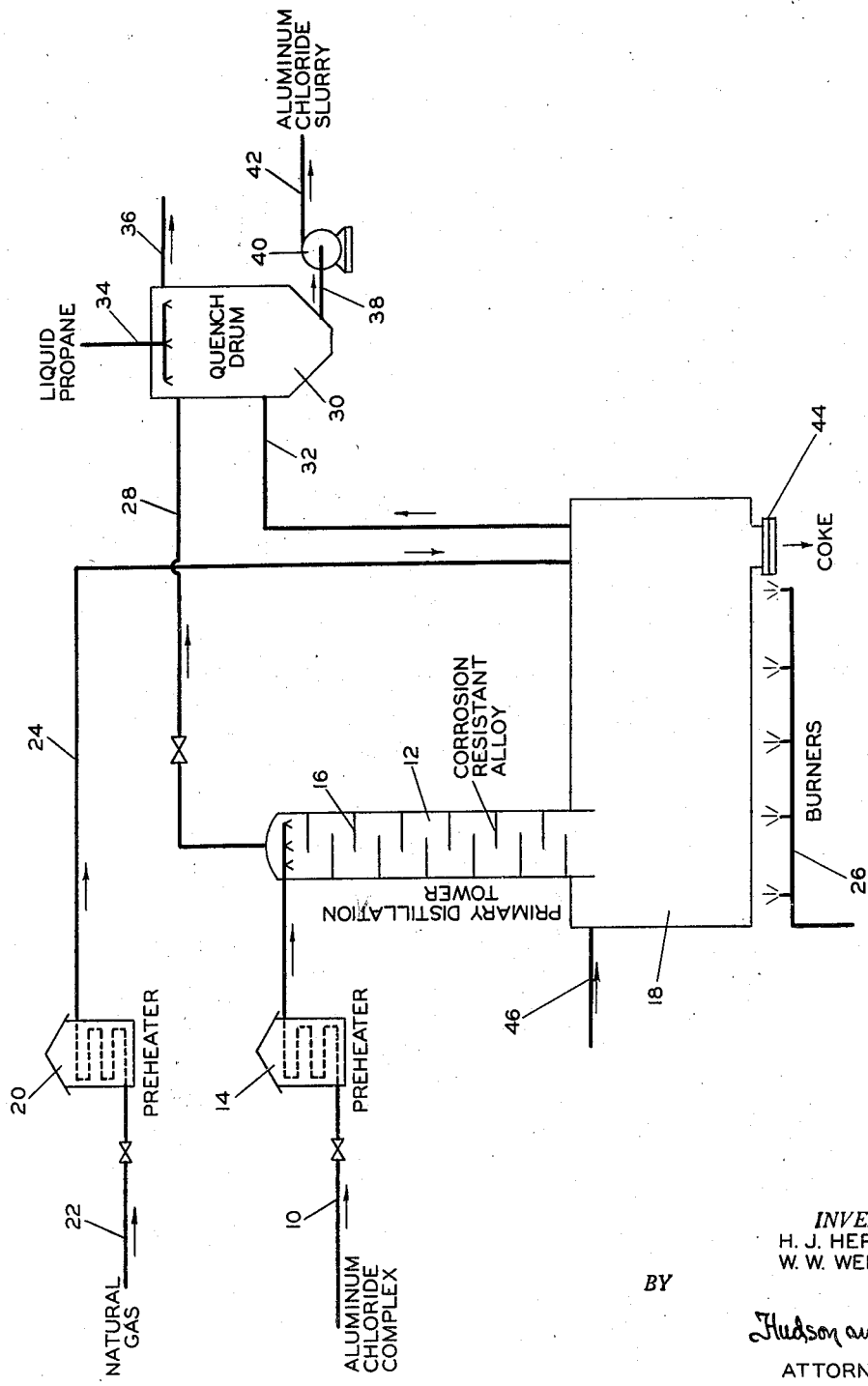
*INVENTORS*
H. J. HEPP
W. W. WEINRICH
BY
*Hudson and Young*
ATTORNEYS

UNITED STATES PATENT OFFICE 2,526,564

METHOD OF RECOVERING ANHYDROUS ALUMINUM CHLORIDE FROM FLUID ALUMINUM-HYDROCARBON COMPLEX

Harold J. Hepp and William Whitney Weinrich, Bartlesville, Okla., assignors to Phillips Petroleum Company, a corporation of Delaware Application July 29, 1946, Serial No. 686,960

3 Claims. (Cl. 23—96)

This invention relates to the recovery of anhydrous aluminum chloride from its complex with organic materials. In a particular embodiment the invention relates to the treatment of fluid aluminum chloride-hydrocarbon complex to recover at least a part of the aluminum chloride content thereof.

The recovery of anhydrous aluminum chloride from its complex with hydrocarbons is not new. The treatment of an aluminum chloride sludge or "coky residue" from cracking operations by subjecting this residue to destructive distillation is disclosed in U. S. Patent 1,099,096. The sludge referred to in this patent is a solid at ordinary temperatures, and only by heating to a temperature in excess of 700° F. can substantial amounts of aluminum chloride be recovered therefrom.

The present invention, in contrast, is concerned with the fluid aluminum chloride-hydrocarbon complex presently used as catalyst in alkylation, isomerization and similar processes. These complexes as such are of insufficient activity to sustain the desired reactions, and the activity of the complex is ordinarily brought to the desired level by dissolving or suspending therein additional anhydrous aluminum chloride. During the course of carrying out these processes the dissolved aluminum chloride reacts with a portion of the hydrocarbons present and forms additional complex. In a continuous process, in order to maintain a constant catalytic activity, a portion of the equilibrium complex is withdrawn and aluminum chloride as such is added to the remaining complex in the reaction system. The withdrawn excess complex is a dark colored liquid with a viscosity ordinarily in the range of 50 to 1500 centistokes at 100° F. As withdrawn from an alkylation or isomerization system it usually contains dissolved and suspended hydrocarbon and dissolved hydrogen chloride. The complex itself ordinarily contains from 50 to 70 per cent by weight of aluminum chloride. It is obvious that the discard of this material would represent a very substantial cost item. For example, in a large scale alkylation plant, the catalyst cost may run from 0.5 to 1.0¢ per gallon of alkylate.

It is now known that about 60 to 80 per cent of the aluminum chloride content of the complex may be recovered in anhydrous form suitable for fortifying the complex remaining in the reaction system by subjecting the withdrawn equilibrium complex to destructive distillation. One of the principal drawbacks of such a recovery method is the very severe corrosion of metallic equipment which occurs upon contact of the same with aluminum chloride-containing material. This corrosion is aggravated by the presence of hydrogen chloride which is present in the gas formed by decomposition of the complex.

An object of this invention is to recover anhydrous aluminum chloride from admixture with organic material. Another object is to subject an aluminum chloride-hydrocarbon complex to destructive distillation. A further object is to attain a high percentage recovery of aluminum chloride from a fluid complex catalyst in a form suitable for re-use in catalyzing organic conversion processes. A still further object is to localize corrosion in an aluminum chloride recovery system. Further objects and advantages of the invention will be apparent, to one skilled in the art, from the accompanying disclosure and discussion.

We have found that the mild steels usually used in chemical plants are rapidly corroded when in contact with a hot fluid aluminum chloride complex. For example, at 500° F. the rate of corrosion of a low-carbon steel is 4 inches per year or higher. We have found further, however, that the rate of corrosion is quite low when the steel is in contact with the hard coky residue or with the yet-fluid residue resulting when part of the aluminum chloride content of a complex, such as 30 or 40 per cent, has been distilled out along with any dissolved hydrogen chloride. Taking advantage of these discoveries, we have found that by conducting the destructive distillation of these complexes in a stepwise fashion, an economical and convenient process results in which corrosive concentrations of aluminum chloride are restricted to a single portion of the apparatus so that the use of expensive corrosion-resistant alloys is held to a minimum.

We prefer to subject the aluminum chloride complex to be treated first to heating in a decomposing zone lined with a corrosion-resistant alloy until up to about 50 per cent of its aluminum chloride has been removed in the vapor form. We then pass the residue to a separate decomposing zone made of ordinary corrodible materials of construction and therein subject the same to further heat to recover additional amounts of aluminum chloride. The material transferred from the first to the second zone is a very viscous or solid coke-like material, and the residue resulting from heating in the second zone is a solid carbonaceous material containing limited amounts of aluminum chloride, The accompanying drawing illustrates one arrangement of apparatus elements and flow of material therethrough suitable for the practice of our invention. The drawing is somewhat diagrammatic in nature and shows only one specific embodiment. Various auxiliary items of apparatus, such as control instruments, heat exchange means, and the like, are not shown, inasmuch as they are conventional. It will be appreciated that various changes may be made by one skilled in the art, in view of the disclosure herein, without departing from the broad scope of the invention.

Fluid aluminum chloride-hydrocarbon complex from a source not shown, for instance an alkylation or isomerization plant, is introduced via line 10 into the primary distillation tower 12. Preheater 14 may be interposed in line 10 to heat the incoming complex to 300° to 400° F. if desired. Distillation unit 12 is constructed of, or lined with, corrosion-resistant alloy steel, and preferably contains baffles 16 or other suitable means for providing a large area of contact between the down-flowing complex and the up-flowing hot vapors rising from secondary distillation vessel 18. The baffles 16 should also be made of or covered with corrosion-resistant metal. The nickel-iron alloy known as "Hastelloy-B" has been found to be eminently satisfactory. Other suitable metals include the nickel-containing alloys "Hastelloy-A," "Inconel," "Ni-resist," and nickel metal itself. Less preferably, ceramic ware or other non-metallic corrosion-resistant materials may be employed. Tower 12 is constructed to provide sufficient surface that the temperature of the complex draining from the bottom into vessel 18 is in the range of 400° to 800° F., and is preferably 500° to 675° F. The residence time of the complex in primary tower 12 is sufficiently short that coking does not occur at the temperatures employed.

A light saturated hydrocarbon stream, which may be propane, iso- or n-butane, or a lighter material such as natural gas, is introduced into heater 20 via pipe 22 in such amount that when preheated therein to 700° to 1100° F. sufficient heat is imparted to the complex in tower 12 to heat same to the desired 400° to 800° F. temperature range. Hydrogen, or nitrogen or other inert gases, may be used if desired. The hot carrier gas at first passes from heater 20 via line 24 into secondary distillation vessel 18, and a portion passes through that vessel and enters the bottom of tower 12 for flow as described above. Secondary vessel 18 is constructed of ordinary steel because the aluminum chloride-containing material entering same is substantially non-corrosive. Means indicated diagrammatically by burners 26 are provided for heating vessel 18 to temperatures at least as high as the maximum temperature attained in tower 12, and preferably higher.

The hot carrier gas entering vessel 18 through pipe 24 divides, a portion passing through primary tower 12 where it heats the complex and picks up hydrocarbons, hydrogen chloride, and part of the aluminum chloride content of the complex. The thus-enriched gas then passes via valved line 28 to quench drum 30. The other portion of the hot gas picks up aluminum chloride evolved during the coking of the complex in vessel 18 and passes via line 32 into quench drum 30. The vaporous aluminum chloride is condensed by means of a stream of liquid propane, butane or other anhydrous coolant entering through line 34. Uncondensed vapors are vented through line 36. The resulting slurry of aluminum chloride in liquid hydrocarbon is withdrawn through pipe 38 and may be passed by means of pump 40 and line 42 to further recovery steps or directly to utilization as catalyst.

Although a quench system for recovering aluminum chloride is shown and is preferred, the aluminum chloride may be recovered as such in other manners, as by cooling the vapors by indirect heat exchange in a suitable condenser and recovering the condensed aluminum chloride. The gas withdrawn through line 36 comprises substantial amounts of hydrocarbons, hydrogen chloride, and hydrogen, any one or more of which materials may be recovered for use as desired.

Since coke accumulates in the system, it is necessary to remove it at intervals. This removal may be accomplished by providing one or more suitable manholes 44 for mechanical removal operations, or the system may be flushed with water introduced occasionally through pipe 46, whereby the coke is disintegrated; in the latter case the water and coke are removed through outlet 44.

The system as described may be operated at substantially atmospheric pressure, but in many cases it will be advantageous to operate at higher pressures. For example, when isobutane is used as the quench, medium pressures of 100 p. s. i. g. may be used in order to maintain a portion of it as a liquid at the quench temperature. In other cases, as, for example, when used in conjunction with an alkylation or isomerization unit, pressures of the order of 300 to 600 pounds may be desirable in order to facilitate the introduction of the aluminum chloride-hydrocarbon slurry into the process step. In such cases the carrier gas and quench stream may be one of the saturated feed or recycle streams of the process.

*Example*

As an example of results obtainable by the practice of this invention, a fluid aluminum chloride-hydrocarbon complex discarded from an ethylene-isobutane alkylation system and containing 56 weight per cent aluminum chloride is charged to the apparatus described. Preheated propane is used as carrier gas. The temperature of the liquid residual complex flowing from the bottom of primary tower, which is lined with "Hastelloy-B," is 700° F., and the steel coking vessel is maintained at the same temperature. Seventy per cent of the aluminum chloride originally present in the complex is recovered as anhydrous aluminum chloride. Neither the primary "Hastelloy"-lined tower nor the coking vessel is appreciably corroded by frequent use over a period of several months.

We claim:

1. The improved method of recovering anhydrous aluminum chloride from a liquid aluminum chloride-hydrocarbon complex containing dissolved hydrogen chloride formed in a conversion of hydrocarbons in the presence of aluminum chloride catalyst, while minimizing corrosion of equipment, which comprises flowing said liquid complex downwardly through a vertical baffled contact tower having a contacting inner surface of nickel-containing alloy resistant to corrosion by said liquid complex countercurrently to a rising stream of hot inert gas at temperatures and flow rates such as to effect vaporization and removal of aluminum chloride and hydrogen chloride to an extent sufficient to substantially reduce the corrosivity of the residual complex toward low-carbon steel but insufficient to cause solidification of said residual complex, withdrawing gas enriched with aluminum chloride and hydrogen chloride from a high point in said tower, withdrawing liquid non-corrosive residual complex from a low point in said tower and passing same into a coking vessel having an inner surface of ordinary low-carbon steel, heating said coking vessel sufficiently to liberate further amounts of aluminum chloride from said residual complex and reduce same to a solid, introducing a hot inert gas into said coking vessel as carrier for vaporized aluminum chloride, passing a portion of said hot gas from said coking vessel into said tower at a low point therein for upward flow therethrough, withdrawing from said coking vessel the remainder of said hot gas carrying aluminum chloride vapors liberated in said coking vessel, and recovering anhydrous aluminum chloride from gases withdrawn from said coking vessel and from said tower as aforesaid.

2. The method of claim 1, in which temperatures in said tower are within the range of 400° to 800° F.

3. The method of claim 1, in which temperatures in said tower are within the range of 500° to 675° F.

HAROLD J. HEPP.
WILLIAM WHITNEY WEINRICH.

REFERENCES CITED

The following references are of record in the file of this patent:

UNITED STATES PATENTS

| Number | Name | Date |
|---|---|---|
| 1,405,734 | McAfee | Feb. 7, 1922 |
| 1,426,081 | Hoover | Aug. 15, 1922 |
| 1,460,110 | Owen | June 26, 1923 |
| 1,909,587 | Kuhl et al. | May 16, 1933 |
| 2,373,803 | Baker et al. | Apr. 17, 1945 |
| 2,464,682 | Hepp | Mar. 15, 1949 |

OTHER REFERENCES

Hamlin et al., "Chemical Resistance of Engineering Materials," page 258, pub. in 1923 by Chemical Catalog Co., New York.